(No Model.)

J. G. JOHNSON.
REVERSING MECHANISM FOR ROTARY MACHINES.

No. 483,456. Patented Sept. 27, 1892.

WITNESSES:
Fred J. Dieterich
Edw. W. Byrn

INVENTOR:
John G. Johnson
BY
ATTORNEYS

UNITED STATES PATENT OFFICE.

JOHN G. JOHNSON, OF CHESTER, PENNSYLVANIA.

REVERSING MECHANISM FOR ROTARY MACHINES.

SPECIFICATION forming part of Letters Patent No. 483,456, dated September 27, 1892.

Application filed May 18, 1892. Serial No. 433,482. (No model.)

*To all whom it may concern:*

Be it known that I, JOHN G. JOHNSON, of Chester, in the county of Delaware and State of Pennsylvania, have invented a new and useful Improvement in Reversing Mechanism for Rotary Machines, of which the following is a specification.

My invention is in the nature of certain improvements in reversing mechanism for rotary machines in general, but is designed more particularly for imparting an alternately-reversed rotation to the revolving shaft of steam washing-machines; and it consists in the peculiar construction and arrangement of parts, which I will now proceed to fully describe with reference to the drawings, in which—

Figure 1:
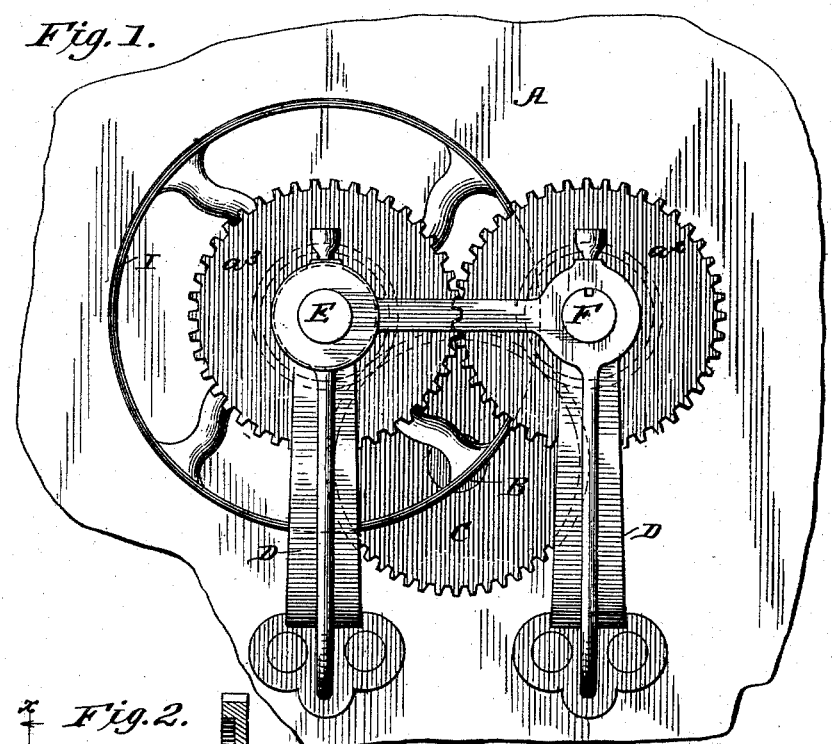
Figure 2:
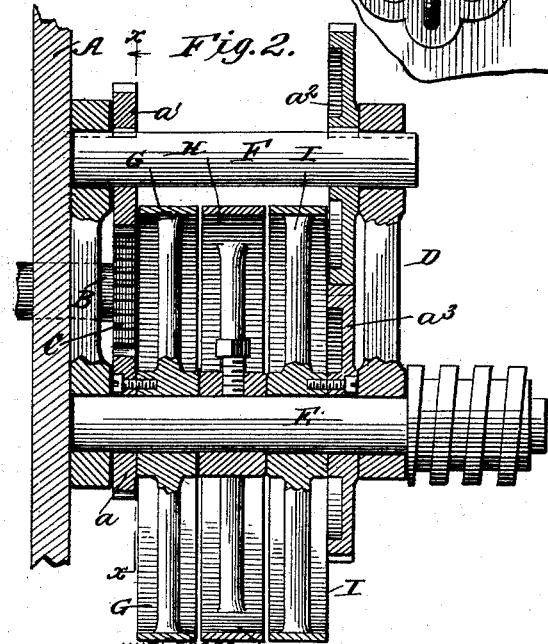
Figure 3:
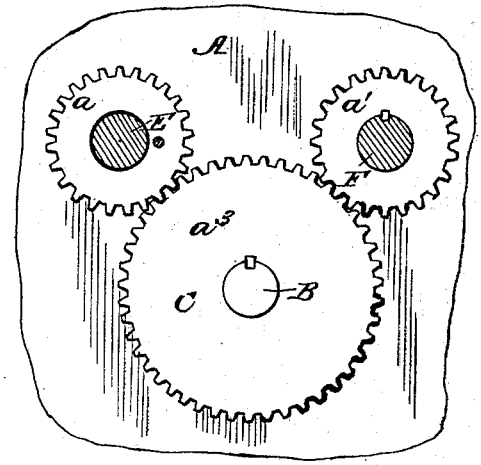

Figure 1 is a side elevation; Fig. 2, a plan with the pulleys in section; and Fig. 3, a vertical section taken through line $x\ x$ of Fig. 2, looking toward the washing-cylinder.

A is the washing-cylinder, within which is arranged a suitable revolving beater or stirrer fixed rigidly upon a shaft B, which emerges through the end of the case and has rigidly keyed to it a gear-wheel C.

Journaled in a suitable frame D at the end of the cylinder are two parallel shafts E F. The shaft E bears three band-pulleys G H I. The middle one H has a slightly-wider face than the others and is fixed tightly upon the shaft. The pulley G on the inside is loose on the shaft and has fixed to its side and turning rigidly with it a pinion $a$, that meshes with the gear-wheel C on the washing-cylinder shaft. The other shaft F has also a rigidly-attached pinion $a'$, of the same size as $a$, which meshes with the gear-wheel C. At the other end of this shaft there is a rigidly-attached gear-wheel $a^2$, which meshes with and derives motion from a similar gear-wheel $a^3$, of equal size, which is fixed to the side of the pulley I and revolves with it loosely upon the shaft E. It will thus be seen that the middle pulley H is tight on its shaft E and its adjacent pulleys G and I, upon opposite sides, are loose. When the band is on the middle or tight pulley H, the shaft E only revolves and the washer is idle. When the band is shifted to the inner loose pulley G, its pinion in direct gear with wheel C rotates the washer in one direction, and when the band is shifted upon the outer loose pulley I the motion of the washer is reversed through the gear-wheels $a'\ a^2\ a^3$. In this construction and arrangement of parts it will be seen that all the gears travel, no matter which way the washer is revolving, and the two loose pulleys, which do the driving, are never wholly disconnected from each other—*i. e.,* when one loose pulley is running in one direction from the belt the backlash of the gears runs the other loose pulley backward or in the reverse direction. The middle tight or idle pulley on the shaft always runs, however, in the same direction, and this pulley's face is made wider than the others, so that the belt in shifting will pass fully off one loose pulley before it reaches the other loose pulley, thus avoiding any antagonism between the active pulleys on the single belt. With this mechanism only a single belt is required, and in driving either one of the loose active pulleys it is made to lap partly over upon the middle or idle pulley, so that only a small range of movement is required for shifting.

For the shifting or transfer of the belt any of the known shifting mechanisms may be employed.

I am aware that three pulleys have been arranged to operate with a single belt for reversing rotating shafts; but the driving motion has always been taken from a loose pulley and a tight pulley on opposite sides of a loose idle-pulley.

My invention is distinctive in the fact that the driving motion is always taken from one or the other of two loose pulleys on opposite sides of an idle-pulley fixed on its shaft, which makes a very simple and effective device for the purpose.

Having thus described my invention, what I claim as new, and desire to secure by Letters Patent, is—

The combination, with the gear-wheel C, connected to the rotating shaft to be reversed, of the shaft E, having a tight pulley H in the middle and loose pulleys G and I upon opposite sides thereof, the pulley G having a rigid pinion $a$ in gear with wheel C and the pulley I having a rigid gear-wheel $a^3$, and the shaft F, having at one end the rigid pinion $a'$ in gear with the wheel C and at the other end the rigid gear-wheel $a^2$, meshing with the gear $a^3$, substantially as shown and described.

JOHN G. JOHNSON.

Witnesses:
WM. I. SCHAFFER,
JOSIAH SMITH.